(12) United States Patent
Schaumann et al.

(10) Patent No.: US 6,520,724 B1
(45) Date of Patent: Feb. 18, 2003

(54) FASTENING ELEMENT AND METHOD FOR AXIALLY SECURING AND CUSHIONING AT LEAST ONE COMPONENT IN AN OPENING

(75) Inventors: Markus Schaumann, Pleidelsheim (DE); Reiner Schweinfurth, Eppingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,966

(22) PCT Filed: Jun. 7, 2000

(86) PCT No.: PCT/DE00/01852

§ 371 (c)(1),
(2), (4) Date: Jun. 20, 2001

(87) PCT Pub. No.: WO00/77411

PCT Pub. Date: Dec. 21, 2000

(30) Foreign Application Priority Data

Jun. 15, 1999 (DE) .......................................... 199 27 194

(51) Int. Cl.[7] ............................................... F16B 21/18

(52) U.S. Cl. .......................... 411/517; 411/353; 411/521
(58) Field of Search ................................. 411/352, 353, 411/517, 518, 521; 73/861

(56) References Cited

U.S. PATENT DOCUMENTS

| 2,487,802 A | * | 11/1949 | Heimann | ..................... 411/518 |
| 4,692,079 A | * | 9/1987 | Killian et al. | ................ 411/353 |
| 6,126,130 A | * | 10/2000 | Planck | .................... 411/353 X |

FOREIGN PATENT DOCUMENTS

DE 19647086 * 5/1998

* cited by examiner

Primary Examiner—Neill Wilson
(74) Attorney, Agent, or Firm—Ronald E. Greigg

(57) ABSTRACT

For fastening a flow rectifier and a grid in an air flow rate meter, until now two elements have been used, one for the sake of cushioning and the other for the sake of securing. The novel fastening element combines both functions in one element. The fastening element is embodied in undulating fashion and can be deformed in its radial dimension.

13 Claims, 4 Drawing Sheets

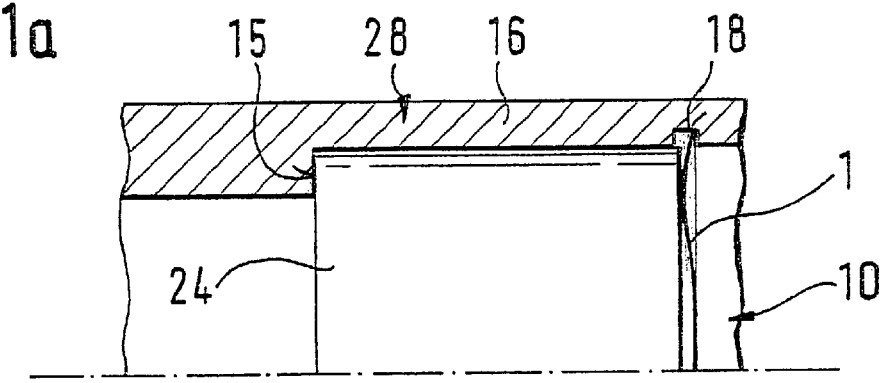
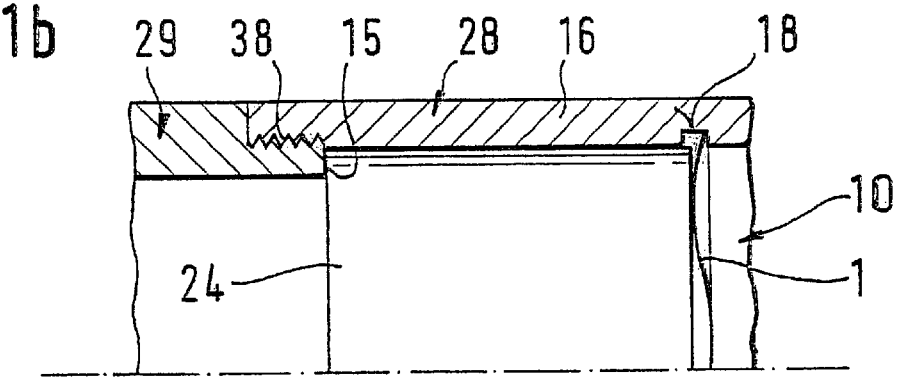
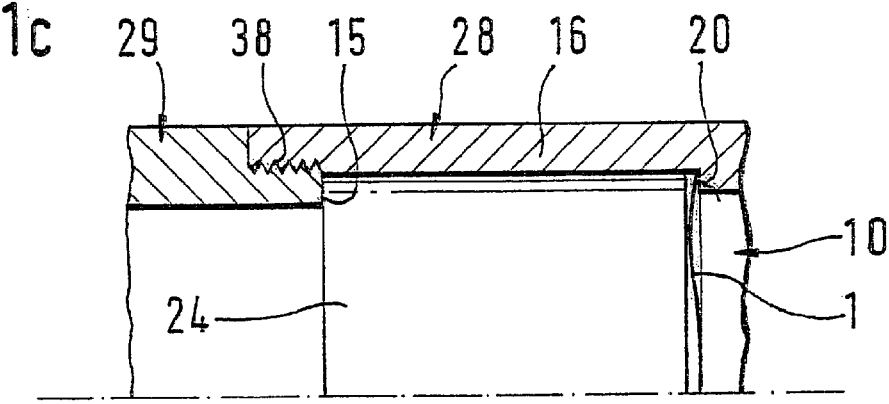

FASTENING ELEMENT AND METHOD FOR AXIALLY SECURING AND CUSHIONING AT LEAST ONE COMPONENT IN AN OPENING

CROSS-REFERENCE TO RELATED APPLICATIONS

This application is a 35 USC 371 application of PCT/DE 00/01852 filed on Jun. 7, 2000.

BACKGROUND OF THE INVENTION

1. Field of the Invention

This invention is directed to an improved fastening element and more particularly to such fastening elements for fastening components in an opening, and on a method, of fastening element in an opening.

2. Description of the Prior Art

It is already known (German Patent Disclosure DE 196 47 086 A1), in an opening of an air flow rate meter that is used to measure the mass or flow rate of a flowing medium, to secure components, that is, a flow rectifier and a grid, axially in an opening with detent hooks and to achieve an axial compensation with spring elements. The spring elements are embodied integrally on the grid and are joined to the grid via a narrow connection region provided on an outer edge of the grid. The spring elements rest on a stop in the opening of the air flow rate meter. For permanent fastening and securing of the components in the opening, the flow rectifier has arrow-shaped detent hooks, which protrude radially outward somewhat past its outer face, and which can snap into an encompassing groove provided in the inner wall of the opening. Upon introduction of the flow rectifier into the opening, the spring elements are deformed elastically and exert a spring force on the flow rectifier. When the flow rectifier reaches its installation position, the detent hooks snap into the groove and permanently hold the flow rectifier in the opening with the aid of the spring force of the spring elements. The disadvantages arise that the spring elements have to be produced and mounted individually, and that elements second, namely the detent hooks, are necessary in order to fasten the components permanently.

U.S. Pat. No. 5,738,059 discloses an open form of a ring embodied in undulating form for use in a coupling element. However, in that case only the spring action of the ring is exploited. It is widely known for components to be fastened in an opening with a spring ring or spring disk and a snap ring on an opposed face end of the component.

SUMMARY OF THE INVENTION

The fastening element of the invention and the method, has the advantage over the prior art that in an especially simple way, at least one component can be fastened in an opening. A further advantage is considered to be that the use of a single element for the fastening, that is, for the axial securing, which at the same time accomplishes an axial compensation, for the at least one component accommodated and resting completely in an opening of an air flow rate meter, reduces the number of elements from two to one. This lowers the production costs. Furthermore, the need to check for the presence and operability of one further element is dispensed with. The compact construction of the fastening element makes easy installation possible and thus enables a high degree of automation. This leads to a further reduction in installation times and production costs. The tools required to mount the fastening element are in part already present or are very simple and therefore inexpensive.

It is advantageous to use the fastening element with a closed ringlike form, because this makes for easy manipulation upon installation. It is also advantageous to use the fastening element with an open ringlike form and a certain outer edge length, as a result of which very secure fastening can be achieved even under very high shaking stresses.

BRIEF DESCRIPTION OF THE DRAWINGS

Other features and advantages of the invention will be apparent from the detailed description contained below, taken with the drawings, in which:

FIGS. 1a–c are fragmentary sectional views showing a plurality of arrangements of an opening with a stop for a component, with a stop edge for the fastening element, and with a component located on the inside along with a fastening element;

DESCRIPTION OF THE PREFERRED EMBODIMENTS

Figure 2:
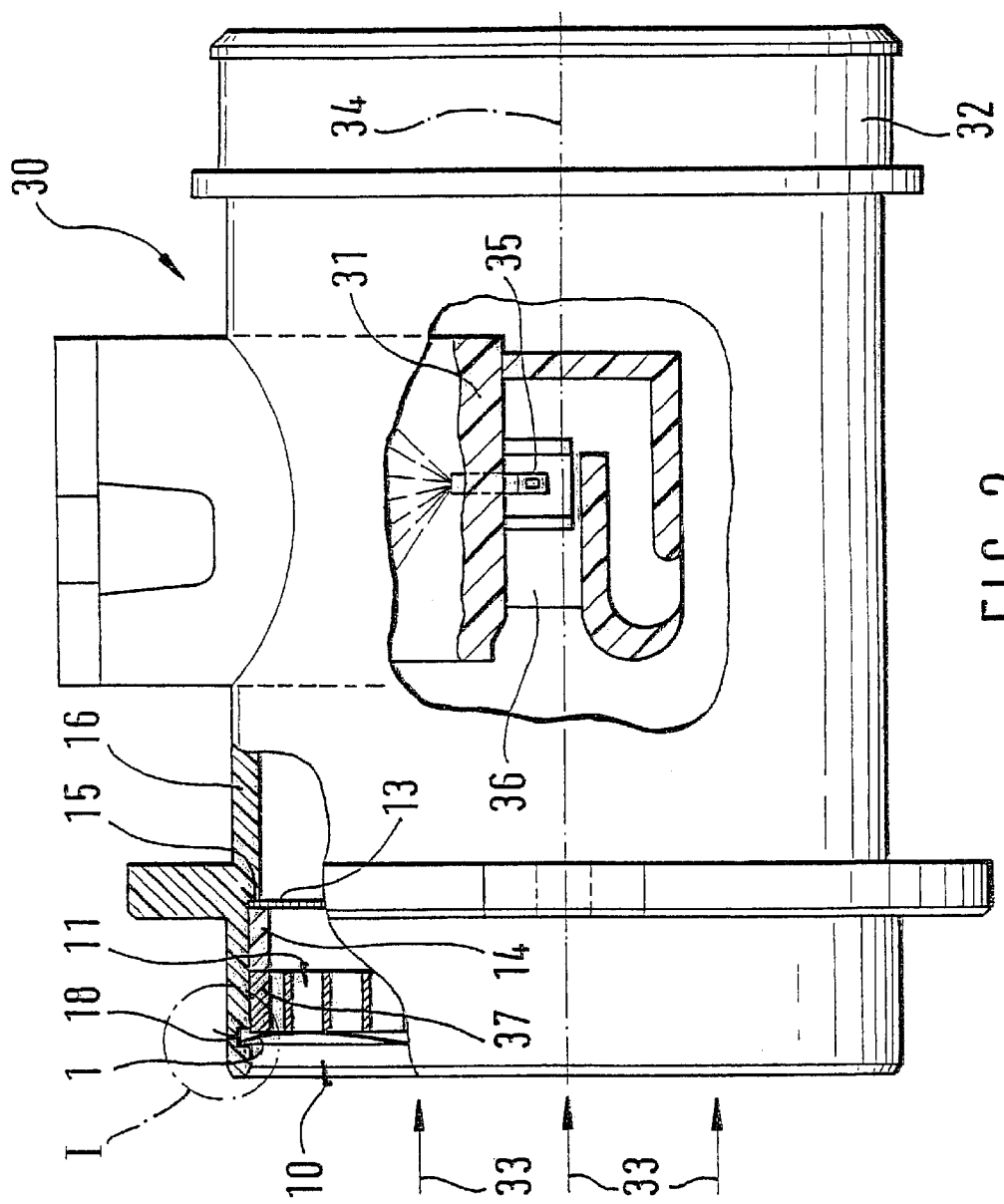
FIG. 2 is an elevation view of an air flow rate meter with portions broken away and embodying two components and one fastening element according to the invention.

Referring now to the drawings in detail FIG. 1a shows how a component 24, for instance, rests on a stop 15 in an opening 10 that has a wall 16 and is fastened in the opening 10 by means of a fastening element 1, which rests in a groove 18 and on the component 24. The groove 18 and the stop 15, in this example, are both a component of a single tube 28. The stop 15 can be embodied not only in the form of a shoulder; it can also be a face that fills the opening 10. For installation, the component 24 is introduced into the opening 10 to the stop 15, and then the fastening element 1 is introduced. The installation will be explained in more detail and precision in conjunction with FIG. 4.

FIG. 1b shows that the stop 15 can also be a component of a second tube 29, which is joined to the first tube 28, for instance by a thread 38.

FIG. 1c shows that the fastening element 1 can rest not only in a groove but also against a stop edge 20 that protrudes into the opening 10. For installation, the component 24 is introduced into the opening 10 of the tube 28 on the opposed side of the stop edge 20. The tube 28 is then joined to the tube 29, so that the fastening element 1 can then be introduced.

FIG. 2 shows an air flow rate meter 30 in partial cross section. The air flow rate meter 30 has a measurement part 31, which is introduced for instance into an insertion opening made in a wall 16 of a measurement stub 32. The construction of such a measurement part 31 with a measuring element 35 is adequately well known to one skilled in the art, for instance from German Published, Nonexamined Patent Application DE-OS 44 07 209, whose disclosure is hereby incorporated into the present patent application by reference. The wall 16 defines a flow cross section, which for example has a circular cross section, in the middle. of which a center axis 34 extends in the direction 33 of the flowing medium, parallel to the wall 16. The direction of the flowing medium is indicated by corresponding arrows 33 and extends there from left to right.

A measuring element 35 is introduced with the measurement part 31 into the flowing medium. In the measurement part 31 of the device 30 a measurement channel 36 is formed, in which the measuring element 35 is accommodated for measuring the medium that flows in the measurement stub 32. Upstream of the measuring element 35, a flow rectifier 11 with a grid 13 is provided. Downstream of the flow rectifier 11, a carrier ring 14 is provided, which supports the grid 13.

For installing the grid 13, the grid is introduced together with the carrier ring 14 into an opening 10, for instance a circular opening, provided on the upstream end of the measurement stub 32, until the carrier ring 14 contacts a stop 15. Next, the flow rectifier 11 can be inserted into the opening 10, until it contacts the carrier ring 14. For permanently fastening the flow rectifier 11 to the grid 13, a fastening element 1 embodied according to the invention is used. The fastening element 1 rests in a groove 18 and on the stop edge 20 thereof (FIG. 5) as well as on the flow rectifier 11.

Figure 5:
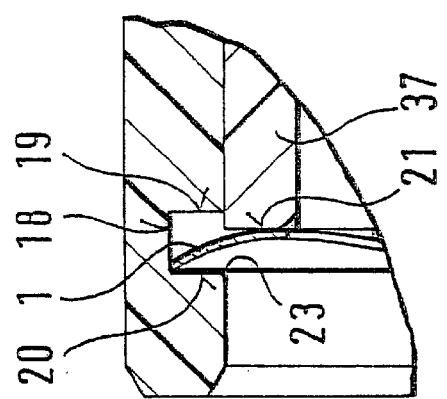
FIG. 5 is an enlarged detail of FIG. 2.
Figure 3A:
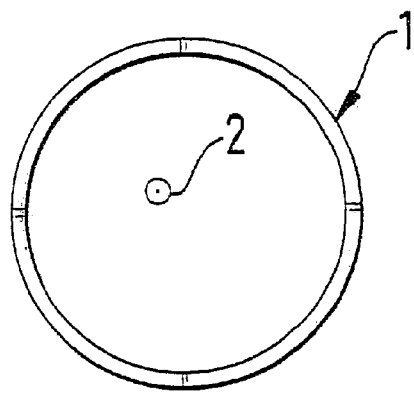
FIGS. 3a–c show a first exemplary embodiment of the fastening element in a plan view, a side view, and a three-dimensional view, respectively.
Figure 3B:
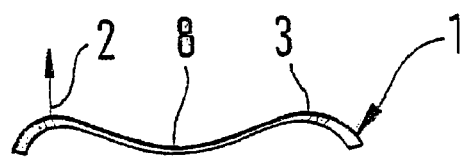
Figure 3C:
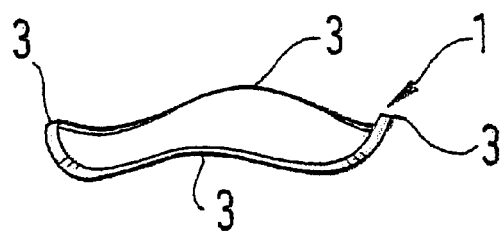

A first exemplary embodiment of the fastening element 1 embodied according to the invention is shown in FIGS. 3a–3c. The outer contour of the annular fastening element 1 has a circular shape in this example (FIG. 3a). A line 2 normal 2 to the area defined by the contour line emerges at a right angle from the plane of the drawing, or in other words extends parallel to the center line of the fastening element 1. The thickness of the fastening element 1 is 0.25 mm, for example. The outside diameter of the fastening element 1 is approximately equal to the outside diameter of the flow rectifier 11 and at maximum is equal to the inside diameter of the opening 10 in FIG. 5 at the level of an edge 19 that is opposite the stop edge 20 (FIG. 5). The inside diameter of the fastening element 1 is not limited. A larger inside diameter of the fastening element 1 in the installed state, compared to the inside diameter of the fastening ring 37 of the flow rectifier 11 (FIG. 2) is advantageous.

In the side view (FIG. 3b), it can be seen clearly that the fastening element 1 is embodied in undulating form in the direction of the normal 2. The difference in height between the crest 3 and trough 8 of the undulation is 5 mm, for example. Four crests 3, each offset by 90°, can be seen in FIG. 3c. The embodiment of such a fastening element is not limited to this number of undulation crests and troughs or to their uniform distribution. The fastening element 1 is expediently made from plastic or metal.

Figure 4:
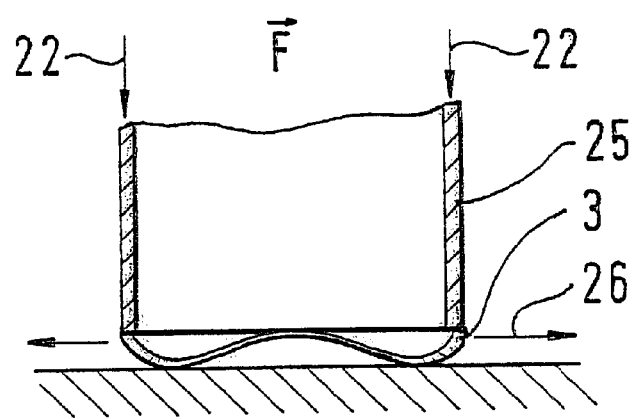
FIG. 4 shows a schematic arrangement of a tool on a fastening element.

FIG. 4 shows schematically how, with a tool 25, for instance, a force F is exerted on the spring ring in the direction of the arrows 22 and how this spring ring is radially deformed in the direction of the arrows 26 when a suitable underlay, such as the components resting on the stop 15, is present. The tool 25 here is a tube, for instance. The contacts of the tool 25 with the fastening element 1 and therefore the engagement points for the force are the undulation crests 3. The outside diameter of the tube 25 is at most as large as that of the fastening ring 37, and the thickness of the tube does not need to be any wider than the width of the fastening element 1, although it can also be thicker.

The fastening element 1 is deformed elastically by the tool 25 primarily in such a way that it enters the groove 18.

Because the outside diameter has become greater as a result, it now projects permanently far enough into the groove 18 and engages the stop edge 20 (FIG. 5) and the flow rectifier 11. The fastening element 1 thus acts as a securing ring. As a result of the deformation, the difference between the undulation crest 3 and the undulation trough 8 has lessened or even vanished. The original difference, however, is dimensioned such that after deformation of the fastening element 1, this difference, plus the thickness of the fastening element 1, is approximately equal to the spacing between the stop edge 20 and the face end 21 (FIG. 5) of the component, in this case the flow rectifier 11. The undulating embodiment of the fastening element achieves a spring action in the direction 33 of the fluid flow and as a result acts as an axial compensation element.

A fastening element 1, of the kind described in the first exemplary embodiment, can also be open or in other words can have a gap. In return, however, the width of this gap must be dimensioned such that as a result of the deformation upon installation, the two ends abut one another, with an ensuing increase in the outside diameter.

Figure 6A:
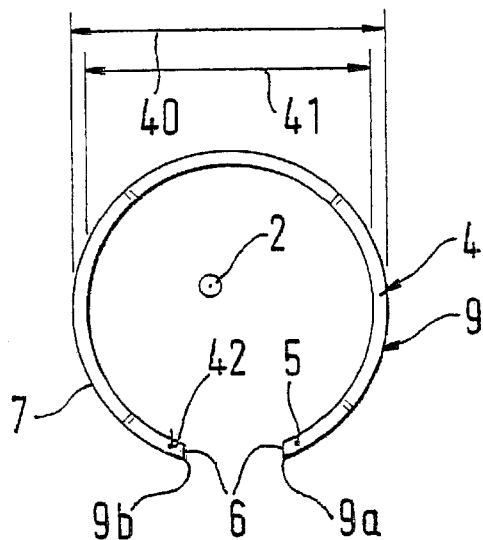
FIGS. 6a–c show a plan view, side view and three-dimensional view of a second exemplary embodiment of the fastening element.
Figure 6B:
Figure 6C:
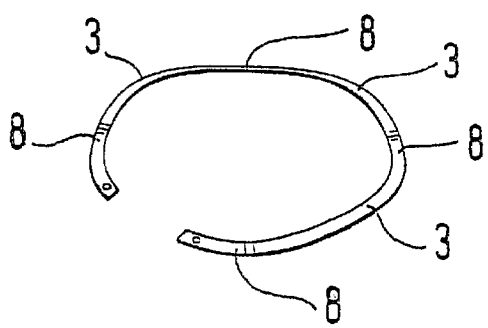

A second exemplary embodiment of a fastening element 4 embodied according to the invention is shown in FIGS. 6a–6c. The outer contour of the annular fastening element 4 has an open circular shape in this example (FIG. 6a). A normal 2 to the area defined by the contour line emerges at a right angle from the plane of the drawing, or in other words extends parallel to the center line of the fastening element 4. The outer edge 9 extends along the fastening element 4 from a point 9a located at the gap to one opposed point 9b, and the length of the outer edge, in proportion to the diameter of the opening 10 at the level 23 (FIG. 5) of the stop edge 20 of the flow rectifier 11, is greater than 1:2.

The cutting edges through the points 9a and 9b at the ends 6 of the fastening element 4 are parallel to one another here. However, this is not absolutely compulsory. The spacing between these cutting edges is 25 mm, for instance. In the vicinity of the ends, for instance centrally, two holes with engagement faces 42 and with a diameter of 1.5 mm, for instance, are drilled into the fastening element 4. The thickness of the fastening element 4 is 0.8 mm, for instance. The greatest and least radial length defined by the open ring will hereinafter be called the outside diameter 40 and inside diameter 41, respectively, of the fastening element 4. The outside diameter 40 of the fastening element 4 is greater than the outside diameter of the flow rectifier 11 and thus also greater than the inside diameter of the opening 10 in FIG. 5 at the level of the edge 19, which is opposite the stop edge 20. The inside diameter 41 of the fastening element 4 is not limited. It is advantageous if the inside diameter 41 of the fastening element 4 in the installed state is greater than the inside diameter of the fastening ring 37 of the flow rectifier 11.

In the side view (FIG. 6b), it can be seen clearly that the fastening element 4 is embodied in undulating fashion in the direction of the normal 2. The difference between the crest 3 and trough 8 of the undulation is 2.3 mm, for instance. In FIG. 6c, four troughs 8 of the undulation can be seen, offset by 90° from each other. The embodiment of the fastening element 4 is not limited to this number or to a uniform distribution of the undulation crests and troughs. The cutout for producing the gap for the open ring can be made in any region of the fastening element 4. In this example, one undulation crest has been removed. The fastening element 4 is expediently made from plastic or metal.

The disposition of the fastening element 4 in the air flow rate meter 30 is equivalent to the arrangement described for the first exemplary embodiment.

Figure 7:
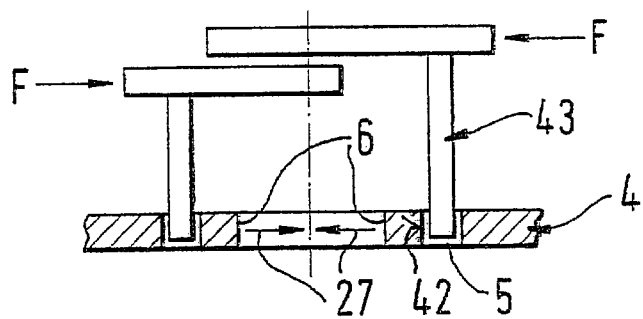
FIG. 7 shows a schematic arrangement of a tool on a fastening element for the second exemplary embodiment.

FIG. 7 schematically shows how, for instance with a suitable gripping tool 43, a force F is exerted in the direction of the arrows 27 on the fastening element 4, and how the fastening element is deformed in the direction of the arrows 27. For introducing the fastening element 4 into the air flow rate meter 30, the fastening element 4 is deformed, by means of the gripping tool, which protrudes into the holes 5 and engages the engagement faces 42, by an expenditure of force in such a way that the two ends 6 of the fastening element 4 are made to approach one another in the direction of the arrows 27. As a result, the fastening element 4 is deformed in such a way that its outside diameter becomes enough smaller that it can be introduced into the opening 10 at the level of the stop edge 20 so that it rests horizontally on the flow rectifier 11. The force on the gripping tool 43 and thus on fastening element 4 is then reduced, and as a result the fastening element 4 presses against the wall 16. With a pressing tool, in a manner similar to the description of the first exemplary embodiment, the fastening element 4 is pressed flat in such a way that the difference between the trough and crest of the undulation is equal to or less than the difference between the face end 21 of the component and the stop edge 20 in the opening. As a result, the fastening element snaps into the groove 18, and because of this the outside diameter 40 of the fastening element 4 increases again. After the pressing tool has been removed, the fastening element 4 now permanently protrudes far enough into the groove 18 and engages both the stop edge 20 and the flow rectifier 11 and thus acts as a securing ring.

As a result of the deformation, the difference between the undulation crest 3 and the undulation trough 8 has lessened or even vanished. The original difference, however, is dimensioned such that after deformation of the fastening element 4, this difference, plus the thickness of the fastening element 4, is approximately equal to the spacing between the stop edge 20 of the groove 18 and the face end 21 (FIG. 5) of the component, in this case the flow rectifier 11. The undulating embodiment of the fastening element achieves a it spring action in the direction of the flow direction 33 and as a result acts as an axial compensation element.

The foregoing relates to preferred exemplary embodiments of the invention, it being understood that other variants and embodiments thereof are possible within the spirit and scope of the invention, the latter being defined by the appended claims.

What is claimed is:

1. A fastening element for fastening at least one component accommodated entirely in and resting on an opening, the fastening element axially cushioning and axially securing the component in the opening, the fastening element (1, 4) comprising a ringlike form and for the sake of the axial cushioning is embodied in undulating form in the direction of one of the normals (2) to the area defined by the ringlike form, and for the sake of the axial securing is dimensioned to engage one of the at least one components (11, 13) accommodated inside the opening (10) and a stop edge (20) located in the opening, wherein the opening (10) is embodied in an air flow rate meter (30).

2. The fastening element of claim 1, in which the fastening element (1) has a closed ringlike form.

3. The fastening element of claim 1, in which the fastening element (4) has an open ringlike form.

4. The fastening element of claim 3, wherein the radial length of the fastening element (1) is created such that only with external exertion of force, it can be placed entirely on at least one component (11, 24) accommodated in the opening (10).

5. The fastening element of claim 4, wherein, on the fastening element (4), at least two engagement faces (42) are provided for the engagement by a gripping tool (43), by means of which by an expenditure of force the two ends (6) of the fastening element (4) can be urged toward each other, as a result of which the fastening element (4) is deformable such that it can be introduced into the opening (10) so as to rest entirely on the at least one component (11, 24).

6. The fastening element of claim 1, wherein the at least one component includes a flow rectifier (11) and a grid (13) on a carrier ring (14).

7. A fastening element for fastening at least one component accommodated entirely in and resting on an opening, the fastening element axially cushioning and axially securing the component in the opening, the fastening element (1, 4) comprising a closed ringlike form and for the sake of the axial cushioning is embodied in undulating form in the direction of one of the normals (2) to the area defined by the ringlike form, and for the sake of the axial securing is dimensioned to engage one of the at least one components (11, 13) accommodated inside the opening (10) and a stop edge (20) located in the opening and wherein the radial length of the fastening element (1) is such that, without external exertion of force, it can be placed entirely on said at least one component (11, 24) accommodated in the opening (10).

8. The fastening element of claim 7, wherein the ratio between the length of an outer edge (9) of the fastening element (4) to the circumference of the opening (10) having the smaller diameter at the level of the stop edge (20) is approximately 1:2 or greater.

9. A fastening element for fastening at least one component accommodated entirely in and resting on an opening, the fastening element axially cushioning and axially securing the component in the opening, the fastening element (1, 4) comprising an open ringlike form and for the sake of the axial cushioning is embodied in undulating form in the direction of one of the normals (2) to the area defined by the ringlike form, and for the sake of the axial securing is dimensioned to engage one of the at least one components (11, 13) accommodated inside the opening (10) and a stop edge (20) located in the opening and wherein the radial length of the fastening element (1) is such that, without external exertion of force, it can be placed entirely on said at least one component (11, 24) accommodated in the opening (10).

10. The fastening element of claim 9, wherein the ratio between the length of an outer edge (9) of the fastening element (4) to the circumference of the opening (10) having the smaller diameter at the level of the stop edge (20) is approximately 1:2 or greater.

11. A fastening element for axially fastening and axially cushioning at least one component entirely within and resting upon an opening having an axial stop and a recessed radial groove, said fastening element comprising, a ringlike form defining an area substantially equal to the area of the opening, said ringlike form being undulating in form in a direction normal to its said defined area, said ringlike for being dimensioned to engage one of the at least one components in the opening and to project radially into the groove in the opening when the undulations are partially axially compressed to thereby permanently secure and axially cushion the component.

12. A method for axially securing and axially cushioning of at least one component, accommodated and resting entirely in an opening, by means of a fastening element, in particular a fastening element including a ringlike form and for the sake of the axial cushioning is embodied in undulating form in the direction of one of the normals (2) to the area defined by the ringlike form, and for the sake of the axial securing is dimensioned to engage one of the at least one components (11, 13) accommodated inside the opening (10) and a stop edge (20) located in the opening the method comprising the steps of the at least one component (11, 13, 24) is introduced into the opening (10); then the fastening element (1) is placed against the component (11, 24); then a tool (25) is positioned against the fastening element (1); after that, the tool (25) is displaced in the direction toward the component (11, 24) until such time as the radial length of the fastening element (1) is increased by deformation such that the fastening element (1) permanently engages a stop edge (20), present in the opening (10), and the component (11, 24); and finally, the tool (25) is removed from the opening (10).

13. A method for axially securing and axially cushioning of at least one component, accommodated and resting entirely in an opening, by means of a fastening element, in particular a fastening element including a ringlike form and for the sake of the axial cushioning is embodied in undulating form in the direction of one of the normals (2) to the area defined by the ringlike form, and for the sake of the axial securing is dimensioned to engage one of the at least one components (11, 13) accommodated inside the opening (10) and a stop edge (20) located in the opening the method comprising the steps of first, introducing the at least one component (11, 13, 24) into the opening (10); then deforming the fastening element (4) by exertion of force by means of a gripping tool (43) and introducing the deformed fastening element into the opening (10) at the level of a stop edge (20) in the opening and of the component (11, 24); then reducing the exertion of force of the gripping tool (43) on the fastening element (4) and removing the gripping tool (43) from the opening (10), so that the fastening element (4) presses against the wall (16) of the opening (10); then by means of a pressing tool, pressing the fastening element (4) n the direction of the component (11, 24) far enough that it snaps into place between the component (11, 24) and the stop edge (20), as a result of which the radial length of the fastening element (4) increases again; and finally removing the pressing tool, as a result of which the fastening element (4) permanently engages the stop edge (20) and the component (11, 24).

* * * * *